United States Patent [19]

Evers et al.

[11] Patent Number: 5,591,076

[45] Date of Patent: Jan. 7, 1997

[54] APPARATUS FOR PROCESSING FLAT FISH

[75] Inventors: Reinhard Evers; Klaus-Werner Götz, both of Stockeldorf; Karl-Dieter Reeps, Bad Schwartau; Olaf Schwarz, Wismar; Conrad Torkler, Hakendorf, all of Germany

[73] Assignee: Nordischer Maschinenbau Rud. Baader GmbH & CO KG, Lubeck, Germany

[21] Appl. No.: 426,739

[22] Filed: Apr. 21, 1995

[51] Int. Cl.$^6$ ................................................ A22C 25/16
[52] U.S. Cl. .......................... 452/157; 452/161; 452/170
[58] Field of Search .................................. 452/161, 162, 452/127, 125, 135, 136, 157, 158, 170

[56] References Cited

U.S. PATENT DOCUMENTS

| | | |
|---|---|---|
| 3,525,120 | 8/1970 | Jobmann ................................. 452/162 |
| 3,964,132 | 6/1976 | Backhaus et al. . |
| 4,025,988 | 5/1977 | Hartmann et al. . |
| 4,050,118 | 9/1977 | Wenzel . |
| 4,291,435 | 9/1981 | Hartmann . |
| 4,300,263 | 11/1981 | Gotz . |
| 4,321,729 | 3/1982 | Ollik . |
| 4,463,478 | 8/1984 | Hartmann et al. . |
| 4,476,610 | 10/1984 | Wenzel . |
| 4,557,019 | 12/1985 | Van Devanter et al. . |
| 4,630,334 | 12/1986 | Evers et al. . |
| 4,635,318 | 1/1987 | Braeger et al. . |
| 4,649,603 | 3/1987 | Bartels . |
| 4,715,092 | 12/1987 | Lerner et al. . |
| 4,726,094 | 2/1988 | Braeger . |
| 4,738,004 | 4/1988 | Lapeyre . |
| 4,748,723 | 6/1988 | Braeger et al. . |
| 4,756,058 | 7/1988 | Gollnitz et al. . |
| 4,868,951 | 9/1989 | Akesson et al. . |
| 4,875,254 | 10/1989 | Rudy et al. . |
| 4,882,811 | 11/1989 | Ewing . |
| 4,899,422 | 2/1990 | King . |
| 4,962,568 | 10/1990 | Rudy et al. .............................. 452/157 |
| 5,061,221 | 10/1991 | Holzhuter et al. . |
| 5,088,958 | 2/1992 | Evers ....................................... 452/161 |
| 5,106,335 | 4/1992 | Behnk et al. . |
| 5,149,297 | 9/1992 | Braeger et al. . |
| 5,151,062 | 9/1992 | Pontow . |
| 5,192,243 | 3/1993 | Weustink ................................ 452/161 |
| 5,259,810 | 11/1993 | Evers et al. . |
| 5,352,153 | 10/1994 | Burch et al. . |
| 5,358,441 | 10/1994 | Hjorth . |
| 5,378,194 | 1/1995 | Hjorth .................................... 452/157 |

FOREIGN PATENT DOCUMENTS

| | | |
|---|---|---|
| 1203058 | 4/1986 | Canada . |
| 0116782 | 8/1984 | European Pat. Off. . |
| 272708 | 6/1988 | European Pat. Off. . |
| 0459558 | 12/1991 | European Pat. Off. . |
| 459558 | 12/1991 | European Pat. Off. . |
| 887066 | 10/1942 | France . |

(List continued on next page.)

OTHER PUBLICATIONS

Baader Sales Catalog, E176 Flat Fish Filleting Machine, Mar. 1993.

Primary Examiner—Willis Little
Attorney, Agent, or Firm—Fay, Sharpe, Beall, Fagan, Minnich & McKee

[57] ABSTRACT

A method and apparatus for processing flat fish is disclosed. The fish (5) are placed on a conveyor (1) and transported on a conveying surface (1.1) over an array of photosensing elements (3.4) which generate light absorbtion signals as the fish is advanced. These signals are sent to a computer, which determines the contour of the fish using information regarding the conveyor speed and computes cutting control signals using pre-programmed proportionality factors relating to the fish species. The cutting line control signals are sent to a cutting apparatus (4). As the advanced fish arrives at the cutting apparatus, two rotary knives (4.1) cut into the dorsal and ventral sides of the fish in response to the control signals to remove the dorsal fin together with a strip of fatty tissue (5.12) from one edge of the fish and the internal organs, the anal fin and the ventral strip of fatty tissue (5.11) from the other edge of the fish.

20 Claims, 3 Drawing Sheets

FOREIGN PATENT DOCUMENTS

| | | |
|---|---|---|
| 2205275 | 5/1974 | France . |
| 2349660 | 4/1975 | Germany . |
| 2510421 | 9/1976 | Germany . |
| 2514612 | 10/1976 | Germany . |
| 2555975 | 5/1977 | Germany . |
| 2747386 | 4/1978 | Germany . |
| 2927583 | 4/1980 | Germany . |
| 512751 | 5/1976 | U.S.S.R. . |
| 621956 | 8/1978 | U.S.S.R. . |
| 1376624 | 12/1974 | United Kingdom . |
| 2271267 | 4/1994 | United Kingdom . |

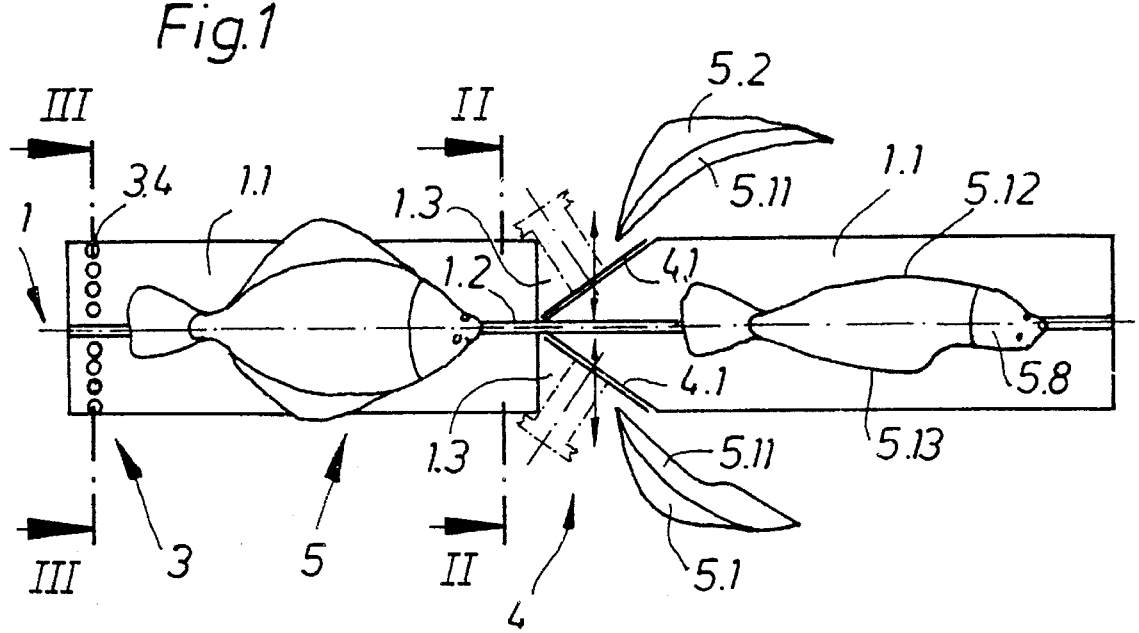
Fig. 1
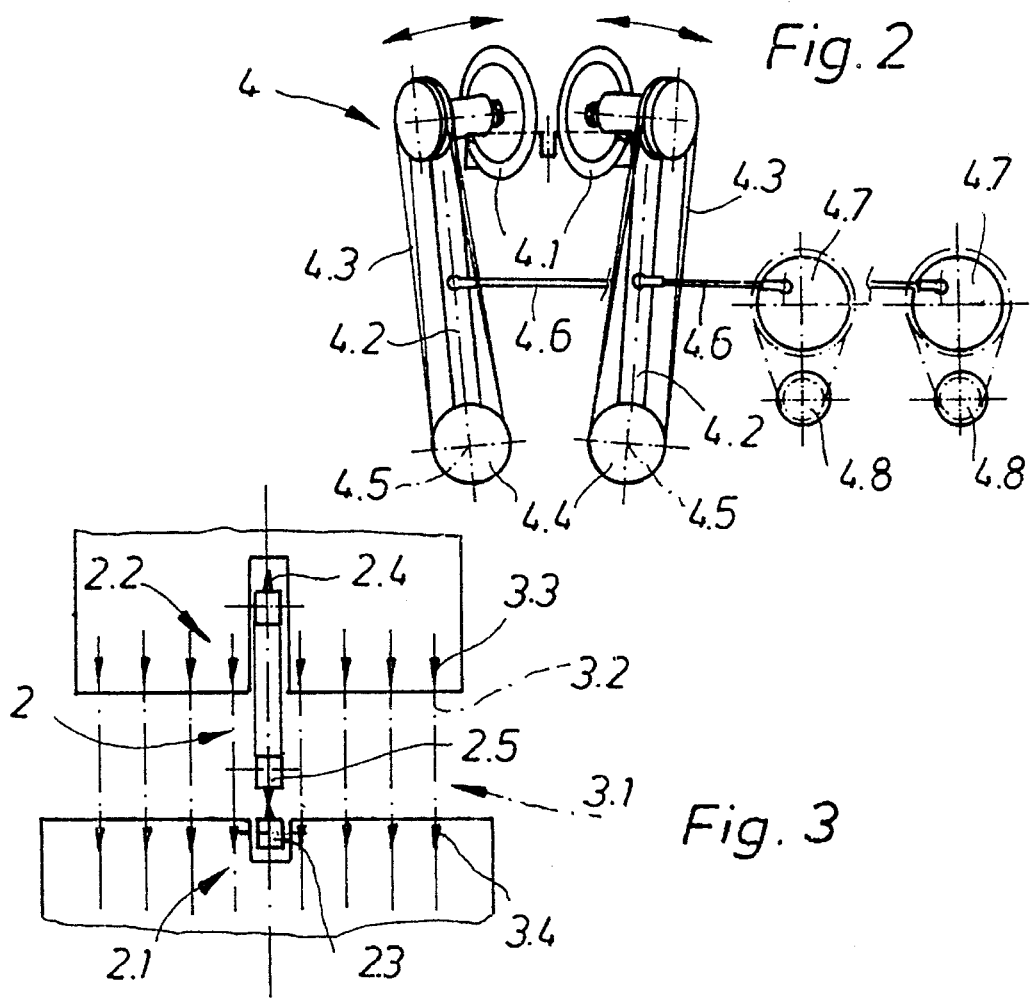
Fig. 2
Fig. 3

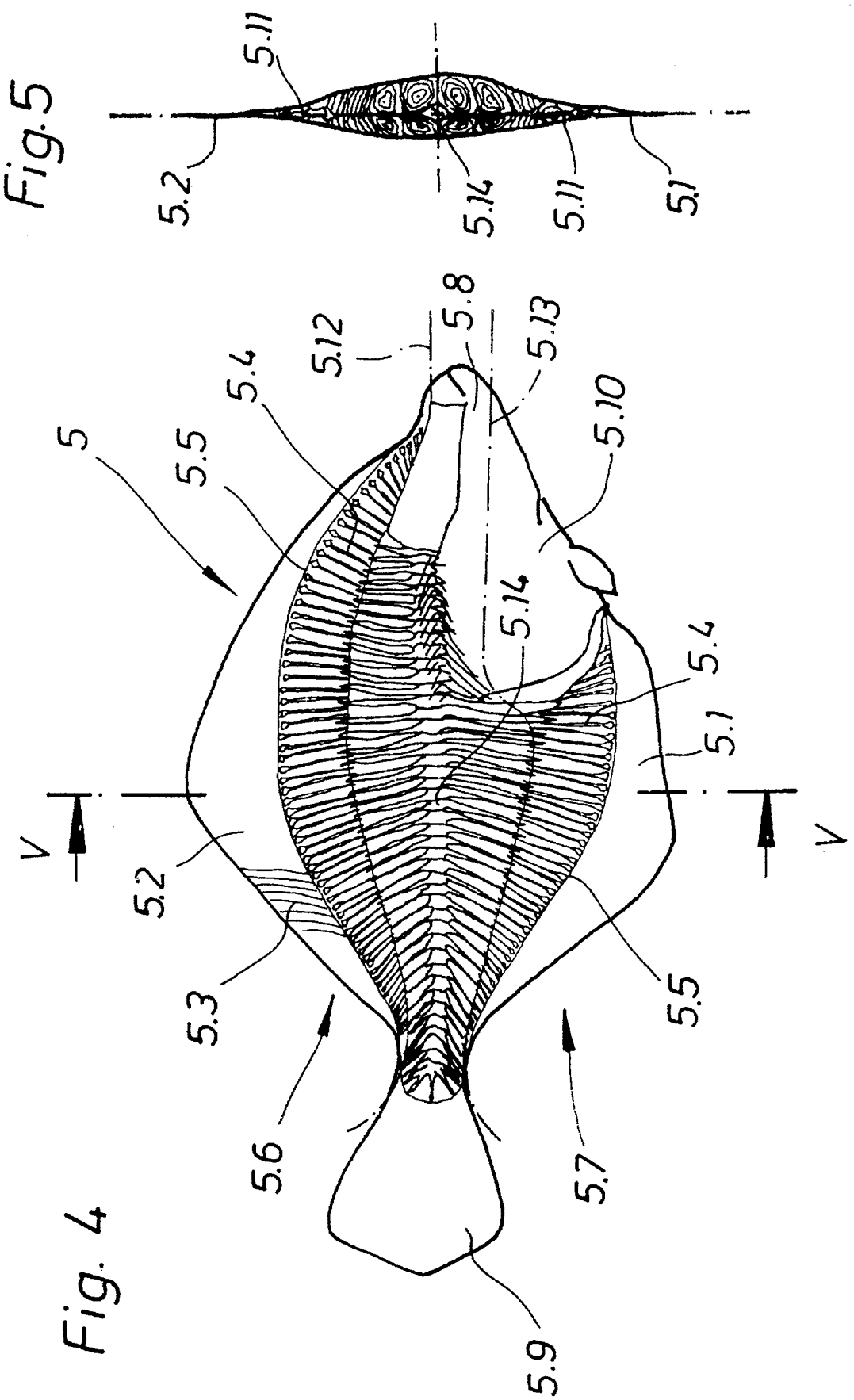

APPARATUS FOR PROCESSING FLAT FISH

BACKGROUND OF THE INVENTION

1. Field of the Invention

The invention concerns a method and an apparatus for automatically processing whole flat fish which include a head, a tail, a body comprising a ventral cavity containing internal organs and defining a ventral and a dorsal edge with ventral and dorsal edge fins extending from the interhemal and interneural spines, respectively, which are imbedded in strips of fatty tissue, wherein the flat fish are conveyed in their longitudinal direction, image data is generated, processed in a controller and then utilized to control at least one cutting apparatus.

2. Prior Art

In general, flat fish fillets are automatically obtained from the fish by means of conventional filletting cuts performed after first removing the head of the fish together with the internal organs and, in some cases, the tail as well.

Particularly efficient flat fish filletting apparatus of this kind are comprised in two machines manufactured by Nordischer Maschinenbau Rud. Baader GmbH & Co. KG, Lübeck, Germany ("Baader"), the Baader 175 and Baader 176 machines, which are described in patents U.S. Pat. No. 3,964,132 and U.S. Pat. No. 5,088,958, respectively. The fillets obtained by these apparatus are free of fins, as the fillets are sliced away from the skeleton in such a way that the dorsal, ventral and anal fins located around the fish edges remain attached to the skeleton.

However, the resulting fillets also have strips of often strongly flavoured fatty tissue, which are characteristic of flat fish attached to their outer edges. These strips of fatty tissue are unacceptable in some consumer markets due to their flavour and have to be removed from the fillets after processing.

This is generally performed by hand, which requires a large number of trimming personnel and results in a considerable increase in cost.

In an attempt to reduce this cost, the document EP 0 272 708 proposes the automated removal of these strips wherein fillets obtained with the conventional filletting apparatus are first skinned and then removed of the fat strips by rotating brushes which brush the fat strip away from the fillet. However, the removal of the fatty tissue with this apparatus has proved unreliable so that the resulting product is rarely satisfactory. In addition, this procedure has an undesirable side-effect to the extent that the processed fillets have a roughened surface as a result of the brushing tools coming into contact with and damaging the fillet surface.

Other apparatus have been developed for pre-processing flat fish to remove the fins prior to a filletting step. An example of such apparatus is disclosed in EP 0 459 558. This apparatus works with an x-ray imaging device which generates a skeleton image of the fish and sends this image data to a processor. The computer controls a water-jet cutting apparatus comprising two cutting nozzles and arranged over the path of the advanced fish in response to the image data. In this manner, the head and the ventral cavity containing the internal organs, the anal and dorsal fins and the tail fin may be removed from the fish body in one cutting process, which may subsequently be filletted.

However this apparatus is very bulky and costly as a result of both the x-ray device and the high pressure water source. Moreover, the employment of these two potentially hazardous units necessitates the observance of costly and complex measures to safeguard operator safety in accordance with safety regulations.

A further apparatus of this kind is disclosed in U.S. Pat. No. 5,378,194 (Hjorth) in which the fish is advanced tail first through a measuring station which determines the fish length and the resulting length measurement is used to select a predetermined programme, which controls the transverse movement of a pair of circular knives with respect to the fish to cut off the fins. The programme controls the knives to describe a curve which is based on the statistically determined approximate relation between the fish length and the fish outer contour. The apparatus further comprises a cutting apparatus for removing the head with the ventral cavity and the tail. This device is activated after the fins have been removed, so that a fin-free fish body is obtained, which may subsequently be filletted in the usual manner.

This patent specifically deals with cutting off the dorsal and anal fins and mentions the problems associated with the removal of the fins, but not the strips of fatty tissue lying inside the fins. As a result, a large number of trimming personnel are required to tidy up the fillets and remove the remaining pieces of fatty tissue from the fillets.

Prohibitively high trimming costs are thus associated with high-yield production of fillets processed with this apparatus.

OBJECTS OF THE INVENTION

It is thus a primary object of the invention to provide a method for processing flat fish prior to their filletting which results in a high yield of high quality fillets.

It is a further object of the invention to provide a method for processing flat fish which will considerably reduce the number of trimming personnel required.

It is yet a further important object of the invention to provide a simple apparatus for carrying out this method efficiently to result in a high throughput.

SUMMARY OF THE INVENTION

These and further objects are achieved according to the invention by a method for automatically processing whole flat fish in which the flat fish are conveyed in their longitudinal direction and image data of the outline of the fish is generated, processed in a processor and then utilized to control a cutting apparatus, wherein the image data is generated using photosensing or electro-optical elements to determine the body contour at the point of attachment of the dorsal and anal fins to the interneural and interhemal spines as well as the anatomical features of the ventral cavity, and the image data is processed in accordance with the fish species, and wherein the processed image data is utilized to control the cutting apparatus to remove the dorsal and anal fins, the fat strip lying inside these fins and also at least a portion of the ventral cavity with the internal organs.

In accordance with a preferred realization of this method the detection of a few relevant image points along the fish body can be used to determine the contour of each individual fish, the photosensing element signals being preferably recorded as a series of repeatedly captured signals along the length of the fish from which the relevant image points located around the body contour can be determined by detecting signal jumps. The image data obtained from this detection is utilized to compute a contour line approximating the body contour of the fish being processed and this contour line is then adapted using predetermined stored proportionality factors relating to the fish species to generate a cutting control signal specific to the fish being processed. This control signal is utilized to control associated cutting apparatus to cut along a line lying inside the approximated contour line to remove the fatty tissue at the dorsal and ventral edges of the fish together with the internal organs located along the ventral edge of the fish behind the head.

For performing the above method there is proposed an apparatus comprising a conveyor system for conveying flat fish in their longitudinal direction, an imaging apparatus for generating fish image data, at least one cutting apparatus and means for processing the image data provided by the imaging apparatus and controlling the setting members of the cutting apparatus, wherein the imaging device comprises a plurality of photosensing elements arranged transversely across the path of the fish for sensing the width dimension of the fish, each photosensing element comprising a light emitter and light receiver, respectively. It will be appreciated, that the invention is not limited to photosensing apparatus, any form of sensing device which can detect image points along the outline of fish while the latter is advanced could be successfully applied to this apparatus.

According to a preferred embodiment of the invention, the light emitters and receivers of each photosensing element are arranged opposed to one another across a space to generate an array of light beams or a light barrier through which the fish is advanced. In the preferred embodiment, the fish are conveyed on a supporting surface. Either the light emitters or light receivers are arranged in this surface such that they form part of the sliding surface. This has the additional advantage that the surface becomes effectively self-cleaning. It has also proved advantageous for the photosensing elements to operate with infrared light. This allows the image detection to be carried out without being adversely affected by interference.

The preferred apparatus includes a cutting apparatus comprising two driven circular knives, each being arranged on a different side of the fish path and being laterally movable with respect to the fish. Cutting apparatus comprising rotary circular knives for removing the fins from flat fish are well known in the art, examples include those disclosed in the Icelandic patent 1668 or the German patent DE-OS-22 27 830.

The circular knives are preferably arranged to extend essentially perpendicular to the supporting surface and inclined relative to one another to enclose an acute angle away from the advancing fish.

It is expedient that each circular knife be mounted on the free end of a pivot lever, on which setting members act to generate the transverse movement of the knives. The setting members are preferably provided in the form of stepping motors.

BRIEF DESCRIPTION OF THE DRAWINGS

Further objects and advantages of the present invention will be apparent from the following description and claims and are illustrated in the accompanying drawings, which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings:

FIG. 1 shows a top view of the apparatus according to the present invention in schematic representation, FIG. 2 shows a cross-section of the apparatus along the line II—II of FIG. 1, FIG. 3 shows a cross-section of the apparatus through the line III—III of FIG. 1, FIG. 4 shows a diagram of a flat fish specifically showing the outer contour, the fins and details of the skeleton, FIG. 5 shows a cross-section of the fish along the line V—V in FIG. 4.

DETAILED DESCRIPTION OF THE PREFERRED EMBODIMENT

Figure 6:
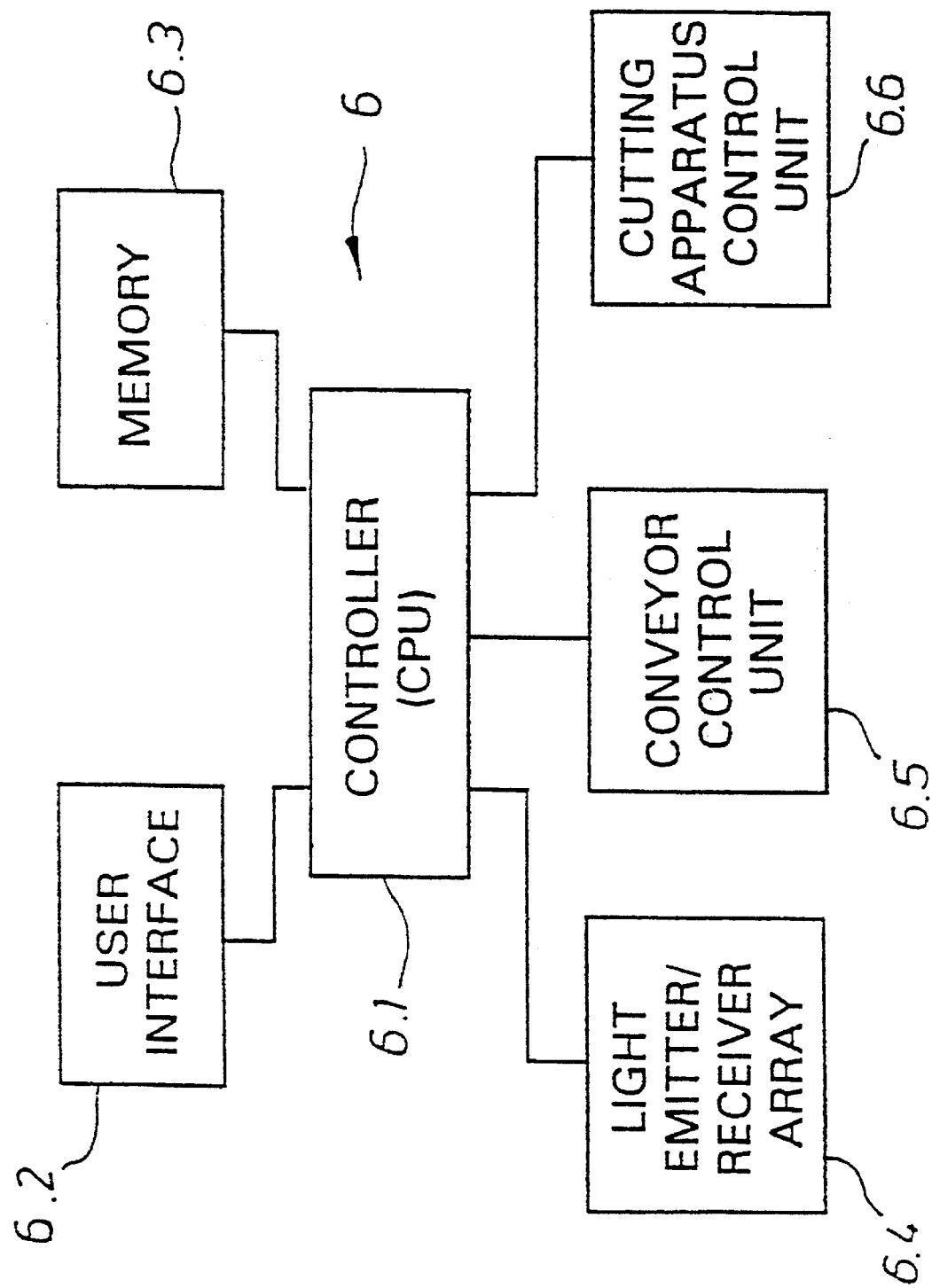
FIG. 6 shows a functional block diagram which schematically illustrates the control system of the invention.

FIG. 1 shows a general schematic overview of the preferred embodiment of the apparatus according to the invention. The apparatus is mounted in a machine frame, which is not illustrated in the figures. It defines a fish processing path 1 along which the fish is advanced with its head leading past an imaging apparatus 3 and a cutting apparatus 4. On the basis of data generated by the imaging apparatus, the cutting apparatus is controlled to cut away unwanted portions of the fish including the fins 5.2, a layer of fatty tissue 5.11 lying inside the fins 5.2 and the internal organs located to the side and behind the head 5.8.

The fish are advanced by means of a conveyor system 2, shown in detail in FIG. 3, having a lower conveyor 2.1 and an upper conveyor 2.2 between which the flat fish are held. The conveyor system 2 runs through the whole of the apparatus.

The processing path 1 comprises a supporting surface 1.1 which serves as a slide for the fish being processed and has a central gap 1.2 extending throughout its length in which the conveyor run 2.3 of the lower conveyor 2.1 is arranged. The conveyor run 2.3 is provided with spines 2.4, which protrude above the supporting surface 1.1 from the gap 1.2 for engaging the fish 5. The upper conveyor 2.2 is likewise provided with spines 2.4 and is arranged with its conveyor run 2.5 directly above the conveyor run 2.4 of the lower conveyor 2.1. The lower and upper conveyors are circularly driven in an appropriate and non-illustrated manner and controlled by a control system 6 to operate synchronously at a predetermined speed. The upper conveyor run 2.5 is resiliently biased towards the lower conveyor run 2.3 in a known and non-illustrated manner to ensure a secure hold on the fish between the two conveyor runs.

The imaging apparatus 3 is located at the start of the fish path 1 and comprises an array of eight photosensing elements 3.2 spaced at predetermined distances apart and each including an infrared light emitter 3.3 arranged above the supporting surface 1.1 and an infrared light receiver 3.4 arranged in the supporting surface 1.1, respectively. In operation, the photosensing elements generate a light barrier 3.1 which extends across the fish processing path 1. Any interference of this barrier 3.1, for example, by the passing of a fish, is registered by the light receiver 3.4 and converted into image data by associated electronics, which is not shown in the figures. The intensity of the light emitters 3.3 is automatically controlled by the control system 6 through the associated electronics, on the basis of the received signal from the light receivers 3.4. This is preferably performed by comparing each of the received signals with a threshold value before or between imaging fish, but can also be achieved by comparing the received signals with each other. If the signal received from one or more light receivers 3.4 is determined to be too low, the intensity of light emitted by the corresponding light emitter or emitters 3.3 is adjusted accordingly. In this way, the imaging apparatus 3 is able to compensate for variations between the photosensing elements 3.2 and for external influences, such as accumulated dirt on some or all of the elements 3.2.

The cutting apparatus 4 shown in FIG. 2 comprises a pair of driven circular knives 4.1 which rotate in planes arranged essentially perpendicular to the supporting surface 1.1 and enclosing an angle of about 80° away from the advancing fish. They are arranged in a gap 1.3 formed in the supporting surface 1.1. Each circular blade 4.1 is mounted at the free end of a pivot lever 4.2 and driven as indicated in FIG. 2 by means of belt drive 4.3 and a driving wheel 4.4 rotating about an axis 4.5. The levers 4.2 are arranged to be pivotal about the axes 4.5. An actuating rod 4.6 is engaged with each pivotal lever 4.2 and is driven by a stepping motor 4.8, respectively. The lateral movement of the dorsal and ventral rotating knives, i.e. the upper and lower rotating knives in FIG. 1, is thus actuated by the stepping motors 4.8, which are controlled by the controller through the cutting apparatus control unit 6.6.

In order to fully understand the processing step carried out by the invention, the anatomy of a flat fish should be explained in more detail. A representation of a typical flat fish is shown in FIGS. 4 and 5. FIG. 4 shows the skeleton of the fish including the vertebrae 5.14, the interneural (dorsal) and interhemal (ventral) spines 5.4 and the dorsal and anal fins, 5.2 and 5.1, attached to the distal ends of the interneural and interhemal spines 5.4, respectively. The body of the fish is defined by the outline 5.5, which is also the point of attachment of the fins 5.2 and 5.1. The head 5.8, the tail 5.9, the ventral cavity 5.10 containing the internal organs are also shown. The fillet meat of a flat fish, depicted by the closely spaced contour lines in FIG. 5, lies essentially on the vertebrae 5.14 extending to the proximal ends of the interneural and interhemal spines 5.4. The strongly flavoured fatty tissue 5.11 lies between the edges of the fillet meat and the dorsal and anal fins, 5.2 and 5.1, and surrounds the interneural and interhemal spines 5.4. The two cutting lines followed by the dorsal and ventral rotating knives 4.1 are also indicated in FIG. 4 by dash-dotted lines 5.12 and 5.13, respectively. It is clear from this figure that these cutting lines essentially pass through the proximal ends of the interneural and interhemal spines 5.4.

The function of the apparatus is controlled by the control system 6, as depicted schematically in FIG. 6. A controller 6.1, which may be a CPU, computer or specific hardware or software configuration forms the heart of the control system and coordinates the various functions.

Operation of the apparatus is through the user interface 6.2 of the control system 6. For example, the species of fish to be processed is set through the user interface 6.2. Characteristics of several species of flat fish are stored in the memory 6.3 and are accessible by the controller 6.1. The controller 6.1 receives the data signals from the photosensing emitter-receiver array 3, and also controls the operation and thus the speed of the conveyor 2, as is schematically illustrated by the conveyor control unit 6.5. It will be appreciated, however, that the conveyor 2 can be controlled by a separate unit and that the speed of the conveyor 2 can be either detected by the controller 6.1 or assumed, based on a preset constant conveyor speed.

The controller 6.1 receives the output of all the light receivers 3.4 from the photosensing array 3.2 at a predetermined time interval. In consideration of the known conveyor speed, discrete image points are taken along the outline of the fish at a predetermined distance apart. By virtue of the fixed arrangement of the photosensing elements 3.2 across the fish path 1, the difference in output signal strength between adjacent photosensing elements 3.2 and between adjacent intervals can be detected and used to determine the location of the edge of the fish 5. In the preferred embodiment, the photosensing sampling interval and the conveyor speed are set such that the discrete image points are taken approximately every 2 mm along the length of the fish and the four photosensing emitter-receiver pairs 3 located on either side of the conveyor are arranged to be spaced approximately 20 mm, 40 mm, 60 mm and 85 mm from the conveyor 2, respectively. This particular arrangement has been found to produce high precision imaging over the range of species and size of fish to be processed for the desired throughput rate.

The various parts of a flat fish absorb infrared light to a different extent, in particular the dorsal and anal fins, 5.2 and 5.1, absorb considerably less light than does the body of the fish 5. Thus, if one photosensing element 3.2 of the array at a given sampling interval has an output of a very low signal intensity, then it is assumed that the body of the fish is blocking the photosensing element 3.2. If the adjacent photosensing element 3.2 has a greatly increased signal intensity, then it is assumed that it is not blocked by the fish body, but rather by the fin 5.1, 5.2 of the fish, or not blocked at all. These determinations can be made by comparing the signals output from the photosensing elements 3.2 with threshold levels and/or by comparison with each other by the controller 6.1 after they have been converted to digital signal values, for example. Hence by adjusting the strength of the emitters and/or the sensitivity of the receivers, the edge of the fish body 5.5 can be determined including the attachment points of the dorsal and anal fins 5.2, 5.1 to the fish body. This is accomplished by making the aforesaid adjustment so that the emitted infrared light that is transmitted through the fins is clearly distinguishable from the emitted light transmitted through the fish body.

The digital signals are processed by the controller 6.1 as discrete points of image data that represent the edge of the fish body. Using these image points and an approximation algorithm technique executed by the controller 6.1 by appropriate software, a continuous outline of the fish body in the form of points approximately 2 mm apart along the length of the fish is determined.

The controller 6.1 then selects the appropriate fish species characteristics stored in the memory 6.3 in accordance with the fish species input in the user interface 6.2. These characteristics comprise predetermined proportionality factors which corresponding to various anatomical features of the fish species. The proportionality factors are determined by statistical studies of the fish species and include factors such as the length of the ventral cavity 5.10 as a proportion of the fish length, the width of the strip of fatty tissue 5.11 as a proportion of the fish width, and the like. The controller 6.1 uses the stored proportionality factors together with the determined fish body outline and the known conveyor speed to control the movement of the cutting apparatus 4 through the control unit 6.6 as the fish passes the cutting apparatus. The cutting apparatus is controlled to perform two cuts 5.12 and 5.13, which are individually determined for the specific fish being processed to remove the dorsal and anal fins 5.2, 5.1 together with the internal organs from the fish body.

The control system 6 allows several fish 5 to be imaged by the imaging apparatus 3 before the first fish reaches the cutting apparatus 4. Since the distance between the imaging apparatus 3 and the cutting apparatus 4 is fixed and the speed of the conveyor is known by the controller 6.1, this is achieved by associating the cutting apparatus control signals for each fish with the position of that fish on the conveyor 2. The cutting apparatus control signals are then sent to the cutting apparatus 4 only when the fish reaches the knives 4.1. This ensures that the cutting apparatus is activated to perform a cut specifically determined for an individual fish only when that fish reaches the apparatus.

The operation of the apparatus according to the invention is described in the following.

A flat fish 5 is fed to the conveyor system 2 on its side with the eyes uppermost and the head leading, preferably in accordance with a specific timing signal generated by the controller 6.1 to allow synchronization with the subsequent processing stations and after having been centered by a centering device. The conveyor system 2 engages the fish 5 between the lower and upper conveyor runs 2.3, 2.4 and conveys it on the supporting surface 1.1 along the fish path 1. As the fish passes the imaging apparatus 3, image data corresponding to the infrared light passing through the fish is generated by the photosensing elements 3.2. The analogue signals produced by the light sensors 3.2 are converted into digital signals by means of associated circuitry, which is not illustrated, and then fed to the controller 6.1. On consideration of the set conveyor speed, the controller 6.1 determines the approximate fish outline based on intensity variations in the photosensing element signals and utilizes stored proportionality factors corresponding to the preselected fish species to generate control signals for controlling the cutting apparatus specific to the imaged fish.

It has been found that the adaptation of such proportionality factors to the computed fish outline allows the accurate determination of the anatomy of the individual fish, so that pre-trimming of the fish with the cutting apparatus can be performed effectively and with the minimum of waste.

Depending on the size of the fish, it is also possible to detect the position of various internal features of the fish. The internal organs and the roe sack generally absorb infrared light to a greater extent than the surrounding tissue. Thus the size and shape of the ventral cavity and the position of the roe sack can also be determined from the absorbtion signals generated by the light sensors 3.2. This information can then be used by the controller 6.1 to adjust the cutting lines 5.12 and 5.13 to any peculiarities of the fish being processed, if this is necessary, and to allow the efficient removal of all the internal organs and the roe sack if desired. The safe removal of this latter organ is particularly advantageous, because it is regarded as a highly nutritive delicacy in some parts of the world, and thus may be marketed as a separate product. Also the size of the roe sack varies depending on the time of the year in which the fish are caught.

When the fish reaches the cutting apparatus 4, the stepping motors 4.8 are controlled by the control signals to move the circular knives 4.1 toward and away from the advancing fish to describe a curve, which corresponds to the computed cutting lines 5.12, 5.13. As the fish is advanced, the knives in the dorsal region 5.5 of the fish thus follow the upper cutting line 5.12 indicated in FIG. 4 and the knives in the ventral region 5.7 of the fish follow the lower cutting line indicated by 5.13. At the start of cutting operation, the ventral cut 5.13 is adapted to cut away the lower part of the head 5.8 together with the internal organs contained in the ventral cavity 5.10. The ventral knife 4.1 then moves outwards to cut close to the proximal ends of the interhemal spines 5.4, thereby cutting away the fatty tissue 5.11. The dorsal cut essentially cuts through the ends of the interneural spines 5.4 to remove the dorsal strip of fatty tissue 5.11.

In this manner, fish of the same species are expediently trimmed of the dorsal and ventral fins 5.2, 5.1, substantially all the interneural and interhemal spines 5.4, with their surrounding fatty tissue 5.11, and the ventral cavity 5.10 with the internal organs, irrespective of the fish size.

The product obtained by this apparatus may subsequently be fed to a conventional filletting apparatus to produce flat fish fillets of exceptionally high quality and yield which require practically no manual trimming at the end of processing. Naturally this apparatus need not be used solely in combination with a filletting apparatus. In some markets the trimmed fish are regarded as a product in itself and marketed as such without further processing.

We claim:

1. A method for automatically processing whole flat fish, which include a head, a body comprising a ventral cavity containing internal organs and defining a ventral and a dorsal edge with strips of fatty tissue located at each of said ventral and dorsal edges, and ventral and dorsal edge fins, the method comprising the steps of:

a) conveying said flat fish in their longitudinal direction, b) performing electro-optical imaging of said fish to obtain image data comprising information regarding at least the relative positions of said dorsal and ventral edge fins with respect to the contour of said fish body and, c) processing said image data in accordance with second data specific to the flat fish species to generate a control signal, and d) utilizing said control signal for controlling at least one cut in said fish to remove strips of said fatty tissue together with the dorsal and ventral edge fins.

2. A method as claimed in claim 1, wherein said at least one cut is controlled to also remove the internal organs of the fish.

3. A method as claimed in claim 2, for automatically processing whole flat fish, which comprise interneural spines having distal ends, from which said dorsal edge fins extend, and interhemal spines having distal ends, from which said ventral edge fins extend, wherein said at least one cut is controlled to extend in the region of the proximal ends of said interneural and interhemal spines.

4. A method as claimed in claim 1, wherein said image data comprises a plurality of points representative of the fish body contour, a contour line approximating said fish body contour is determined from these points and said control signal is utilized for controlling said at least one cut to follow a cutting line which falls inside said contour line and is adjusted in accordance with predetermined proportionality factors specific to the flat fish type.

5. A method as claimed in claim 2, wherein said image data comprises a plurality of points representative of the fish body contour, a contour line approximating said fish body contour is determined from these points and said control signal controls said cutting means to follow a cutting line which falls inside said contour line and is individually adjusted in accordance with predetermined proportionality factors specific to the fish type.

6. A method as claimed in claim 3, wherein said image data comprises a plurality of points representative of the fish body contour, a contour line approximating said fish body contour is determined from these points and said control signal controls said cutting means to follow a cutting line which falls inside said contour line and is individually adjusted in accordance with predetermined proportionality factors specific to the fish type.

7. A method as claimed in claim 4, wherein said plurality of points representative of the fish body contour are extracted from said image data by determining relative signal level jumps.

8. A method as claimed in claim 5, wherein said plurality of points representative of the fish body contour are extracted from said image data by determining relative signal level jumps.

9. A method as claimed in claim 6, wherein said plurality of points representative of the fish body contour are extracted from said image data by determining relative signal level jumps.

10. A method as claimed in claim 1, wherein the fish are conveyed under positive engagement.

11. A method as claimed in claim 1, wherein the fish are conveyed with the head leading.

12. An apparatus for carrying out a method for processing whole flat fish, which include a head, a body comprising a ventral cavity containing internal organs and defining a ventral and a dorsal edge with strips of fatty tissue located at each of said ventral and dorsal edges, and ventral and dorsal edge fins, the apparatus comprising a) conveying means for conveying said flat fish in their longitudinal direction, b) photosensing means, arranged adjacent said conveying means for detecting the width dimension of the fish as said fish is advanced and for producing image data indicative of said width dimension;

c) means for processing said image data to determine a cutting line for separating at least strips of said fatty tissue together with the dorsal and ventral edge fins from the fish body and outputting a control signal, and d) at least one cutting apparatus controlled to move in response to said control signal to cut away at least strips of said fatty tissue together with the dorsal and ventral edge fins; and wherein said cutting means comprises two driven circular knives one being arranged on each side of said conveying means and being transversely movable towards and away from the fish.

13. An apparatus as claimed in claim 12, wherein said circular knives extend essentially perpendicular to the supporting surface and are tilted towards one another to enclose an acute angle opening away from the advancing fish.

14. An apparatus as claimed in claims 13, wherein each circular knife is mounted at the free end of a pivot lever and setting means are arranged to engage with said pivot lever for generating said transverse movement.

15. An apparatus as claimed in claim 14, wherein said setting means are formed as stepping motors.

16. An apparatus according to claim 12, wherein said photosensing means comprises a plurality of light emitter and light receiver pairs arranged transversely across said conveyor.

17. An apparatus as claimed in claim 16, wherein the light emitter and light receiver of each pair are arranged to face one another across a space so as to form a light barrier through which the fish is advanced.

18. An apparatus as claimed in claim 17, which further comprises a supporting surface along which the fish is transported, wherein a light emitter or light receiver of each pair is arranged in the supporting surface and forms part of said supporting surface.

19. An apparatus as claimed in claim 12, wherein said photosensing means operate with infrared light.

20. An apparatus as claimed in claim 12, wherein said conveyor means comprise at least two conveyor belts with entrainers, said conveyor belts being arranged such that said fish are held between said conveyor belts and engaged by said entrainers essentially in the region of its spinal column.

* * * * *